United States Patent
Nakamura et al.

(10) Patent No.: US 7,873,919 B2
(45) Date of Patent: Jan. 18, 2011

(54) CONTENT-RETRIEVAL DEVICE, CONTENT-RETRIEVAL METHOD, AND CONTENT-RETRIEVAL PROGRAM

(75) Inventors: Takatoshi Nakamura, Kanagawa (JP); Yuichi Abe, Tokyo (JP); Mitsuru Takehara, Tokyo (JP); Toru Sasaki, Tokyo (JP); Yoichiro Sako, Tokyo (JP); Toshiro Terauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 11/732,416

(22) Filed: Apr. 3, 2007

(65) Prior Publication Data

US 2007/0245267 A1  Oct. 18, 2007

(30) Foreign Application Priority Data

Apr. 12, 2006  (JP) .............................. 2006-109572

(51) Int. Cl.
*G06F 13/00* (2006.01)
*G06F 15/00* (2006.01)

(52) U.S. Cl. ...................................... 715/838; 715/764

(58) Field of Classification Search ......... 715/740–748, 715/763–765, 853–855, 780, 838, 839, 835–837, 715/805

See application file for complete search history.

(56) References Cited

U.S. PATENT DOCUMENTS

| 2005/0094031 A1* | 5/2005 | Tecot et al. ................. 348/473 |
| 2005/0114793 A1* | 5/2005 | Jung .......................... 715/839 |
| 2007/0186189 A1* | 8/2007 | Schiller ...................... 715/838 |

FOREIGN PATENT DOCUMENTS

| JP | 2004-356774   | 12/2004 |
| JP | 2005-159770 A |  6/2005 |
| JP | 2005-284574   | 10/2005 |
| JP | 2005-327121   | 11/2005 |
| JP | 2005-353072 A | 12/2005 |

* cited by examiner

*Primary Examiner*—Cao Nguyen
(74) *Attorney, Agent, or Firm*—Wolf Greenfield & Sacks

(57) ABSTRACT

A content-retrieval device includes first and second operation units, a display unit, storage storing contents, and a control circuit. The control circuit shows at least two thumbnails of the contents stored in the storage and an image of a mark indicating one of the thumbnails on the display unit, performs filtering, when showing the thumbnails, for the shown thumbnails under a predetermined selection condition, changes the strength of the selection condition under which the filtering is performed when the first operation unit is operated, and changes the thumbnail indicated by the mark image to another of the thumbnails when the second operation unit is operated.

18 Claims, 6 Drawing Sheets

FIG. 3

| LINK INFORMATION | xxxxx |
|---|---|
| TRACK NAME | GO SWIM SAMBA |
| ARTIST'S NAME | HIROSHI GO |
| RELEASE DATE | 02. 18. 2000 |
| TOTAL NUMBER OF TRACKS SOLD | 1031930 |
| YEARLY RANKING | 2000: FIRST PLACE<br>2001: FIRST PLACE<br>2002: FIRST PLACE<br>・<br>・<br>・<br>・<br>・ |
| MONTHLY RANKING | ・・・・・ |
| WEEKLY RANKING | ・・・・・ |
| USER RATING | ・・・・・ |
| PRIORITY | ・・・・・ |

CONTENT-RETRIEVAL DEVICE, CONTENT-RETRIEVAL METHOD, AND CONTENT-RETRIEVAL PROGRAM

CROSS REFERENCES TO RELATED APPLICATIONS

The present invention contains subject matter related to Japanese Patent Application JP 2006-109572 filed in the Japanese Patent Office on Apr. 12, 2006, the entire contents of which are incorporated herein by reference.

BACKGROUND OF THE INVENTION

1. Field of the Invention

The present invention relates to a content-retrieval device, a content-retrieval method, and a content-retrieval program.

2. Description of the Related Art

It is common practice to store track data (digital-audio data reproduced, as a track) in storage including a hard-disk drive or the like. If it requires three minutes to reproduce data on a single track and the capacity of the hard-disk drive is 100 gigabytes (GB), data on at least three thousand tracks can be stored in the hard-disk drive. Further, when the track data is encoded according to the Motion-Picture-Experts-Group (MPEG)-1/Audio-Layer-3 (MP3) method or the like, the amount of the track data can be reduced by a factor of ten to twelve. Subsequently, the data corresponding to at least thirty thousand tracks can be stored in the hard-disk drive.

Therefore, when a reproduction device that allows for storing the track data in the hard-disk drive is used, a user of the reproduction device can always keep the track data at hand, select data on a desired track from among the track data, and enjoy the desired track.

The above-described technologies are disclosed in Japanese Unexamined Patent Application Publication No. 2005-284574, for example.

SUMMARY OF THE INVENTION

However, when data on many tracks is stored in a single reproduction device in the above-described manner, an error occurs when a user of the reproduction device tries to retrieve data on a target track. For example, when track data is sorted on the basis of the name of an artist, and the track data is sorted on the basis of the name of a track, so as to retrieve the target track, a result of the former sorting performed on the basis of the artist's name is ignored due to the latter sorting performed on the basis of the track name. Subsequently, it is difficult to retrieve the target-track data.

Further, according to a software program used for a database provided in a personal computer, data retrieval can be performed on the basis of the artist's name, and data on the retrieval result can further be narrowed down on the basis of the track name. However, it is difficult to return information obtained by narrowing down the retrieval-result data to its original state, that is, the state of the retrieval-result data that is not yet narrowed down. Therefore, when a wrong item and/or a wrong retrieval word is used, so as to narrow down the retrieval-result data, the retrieval processing should be performed again from the start, which places a significant processing load on the user.

The present invention has been achieved, so as to solve the above-described problems.

A content-retrieval device according to an embodiment of the present invention includes a first operation unit, a second operation unit, a first display unit, storage storing contents, and a control circuit. The control circuit shows at least two thumbnails of the contents stored in the storage and an image of a mark indicating one of the thumbnails on the first display unit, performs filtering, when showing the thumbnails, for the shown thumbnails under a predetermined selection condition changes the strength of the selection condition under which the filtering is performed when the first operation unit is operated, and changes the thumbnail indicated by the mark image to another of the thumbnails when the second operation unit is operated.

According to an embodiment of the present invention, it becomes possible to track down thumbnails related to a target thumbnail in sequence and eventually retrieve the target thumbnail, and retrieve and reproduce data on a target track with stability. Further, since a display image of the thumbnails is continuously changed in an analog fashion, it becomes easy to retrieve the target thumbnail.

BRIEF DESCRIPTION OF THE DRAWINGS

FIG. 3 illustrates data that can be used for another embodiment of the present invention;

DESCRIPTION OF THE PREFERRED EMBODIMENTS

[1] The Outline of the Present Invention

According to an embodiment of the present invention, the following stipulations (1) to (5) are set.

(1) Contents stored in storage are shown, as thumbnails.

(2) Filtering is performed under a predetermined selection condition when the thumbnails are shown according to stipulation (1).

(3) The strength of the selection condition (the filter-passing range) described in stipulation (2) is made variable.

(4) The thumbnail of target contents is retrieved from among the shown thumbnails.

Accordingly, it becomes possible to retrieve the target contents in an analog fashion.

[2] Example External View of Audio-Reproduction Device

Figure 1:
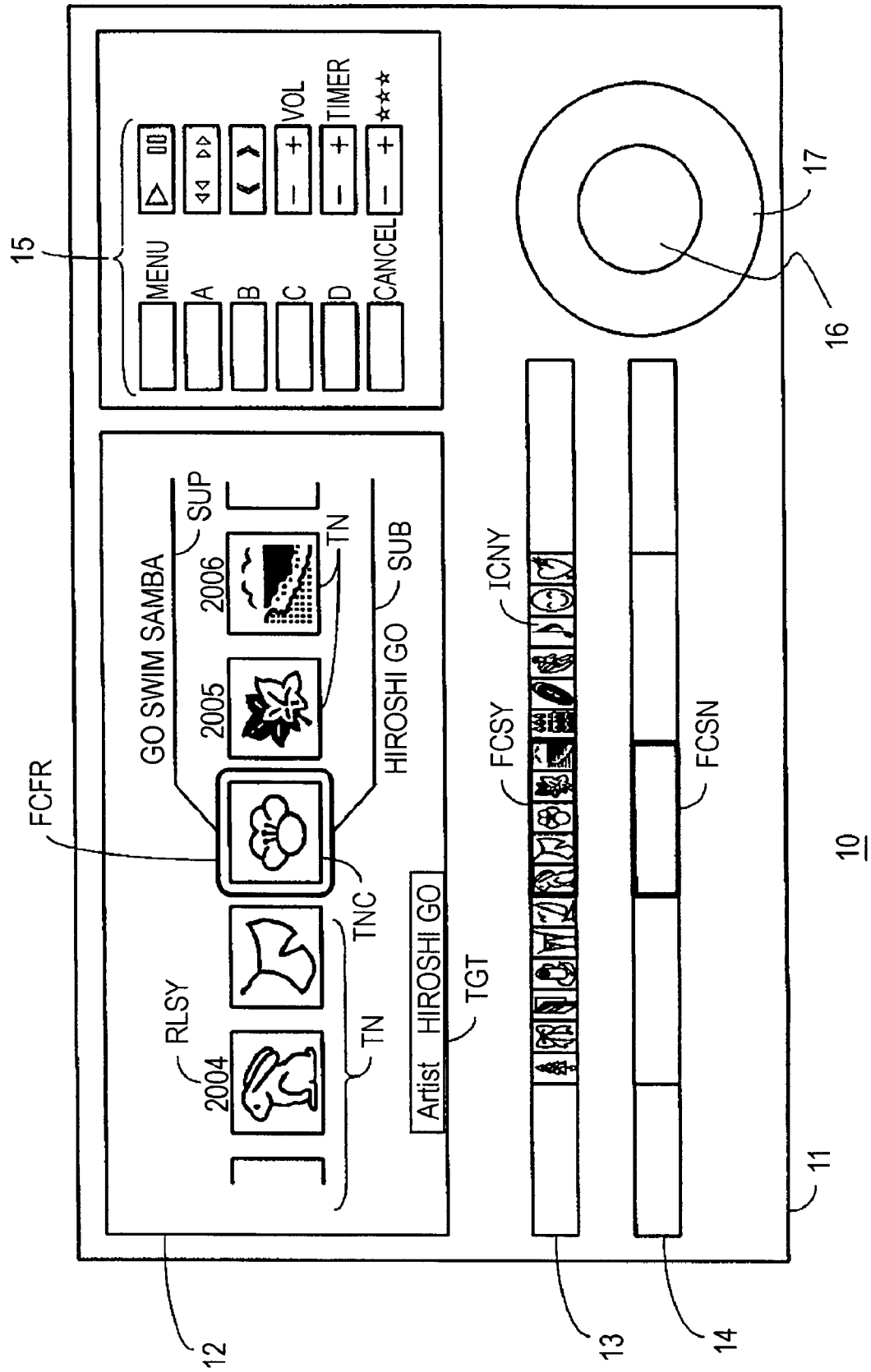
FIG. 1 is an elevation of an embodiment of the present invention.

FIG. 1 shows an example external view of an audio-reproduction device according to an embodiment of the present invention. Reference numeral 10 denotes the entire audio-reproduction device including a front panel 11. The front panel 11 includes a main-display part 12 and two sub-display parts 13 and 14. Each of the above-described display parts 12 to 14 includes a color liquid-crystal-display (LCD) panel. The main-display part 12 is provided in the shape of a horizontally-oriented rectangle extending from the left side to the center of the upper part of the front panel 11. Each of the sub-display parts 13 and 14 is shaped like a belt and provided on the lower part of the main-display unit 12. Further, the sub-display parts 13 and 14 are provided in parallel with each other.

The details on data shown on the display parts 12 to 14 will be described later in chapter [4]. On each of the display parts 12 to 14, the horizontal-axis direction denotes the time axis. The main-display part 12 is provided, so as to show main information. During the track selection, for example, the main-display part 12 shows a thumbnail indicating a track, and information relating to the track, such as the track name, the artist's name, and so forth. Further, each of the sub-display parts 13 and 14 shows a subsidiary display image indicating the year range where the track indicated by the thumbnail shown on the main-display part 12 is released.

Further, various operation buttons 15 are provided on the front panel 11 at the upper-right part thereof. A selection dial 16 and a zoom dial 17 are coaxially provided under the operation button 15 so that the selection dial 16 is provided inside the zoom dial 17.

In that case, the operation buttons 15 includes a button relating to the track-data acquisition or the like, a button provided, so as to instruct the audio-reproduction device 10 to reproduce and/or stop reproducing data on a selected track, adjust the volume, and so forth, a button provided, so as to show a thumbnail and/or indicate an item, and so forth. The selection dial 16 and the zoom dial 17 will be described in detail in chapter [4]. The selection dial 16 is provided, so as to select a track by selecting the thumbnail shown on the main-display part 12. The zoom dial 17 is provided, so as to change the strength of a selection condition under which the display images of thumbnails are filtered while the filtering is performed.

In the following description, the zoom dial 17 is often turned, so as to increase the strength of the filtering-selection condition. That is to say, the zoom dial 17 is often turned in a predetermined direction, so as to select a predetermined thumbnail from among many thumbnails. The above-described turning operation can be compared to a zoom operation performed by a zoom lens. In the following description, therefore, the above-described turning operation will be referred to as a zoom-in operation. On the contrary, an operation performed, so as to decrease the strength of the filtering-selection condition, will be referred to as a zoom-out operation.

Further, though not shown, a slot is provided on the right-side face of the audio-reproduction device 10 so that a disk including a compact disk (CD), a digital versatile disk (DVD), and so forth can be inserted in the slot. Still further, though not shown, another slot is provided on the right-side face of the audio-reproduction device 10 so that a memory card can be inserted into the slot.

[3] Example Hardware

Figure 2:
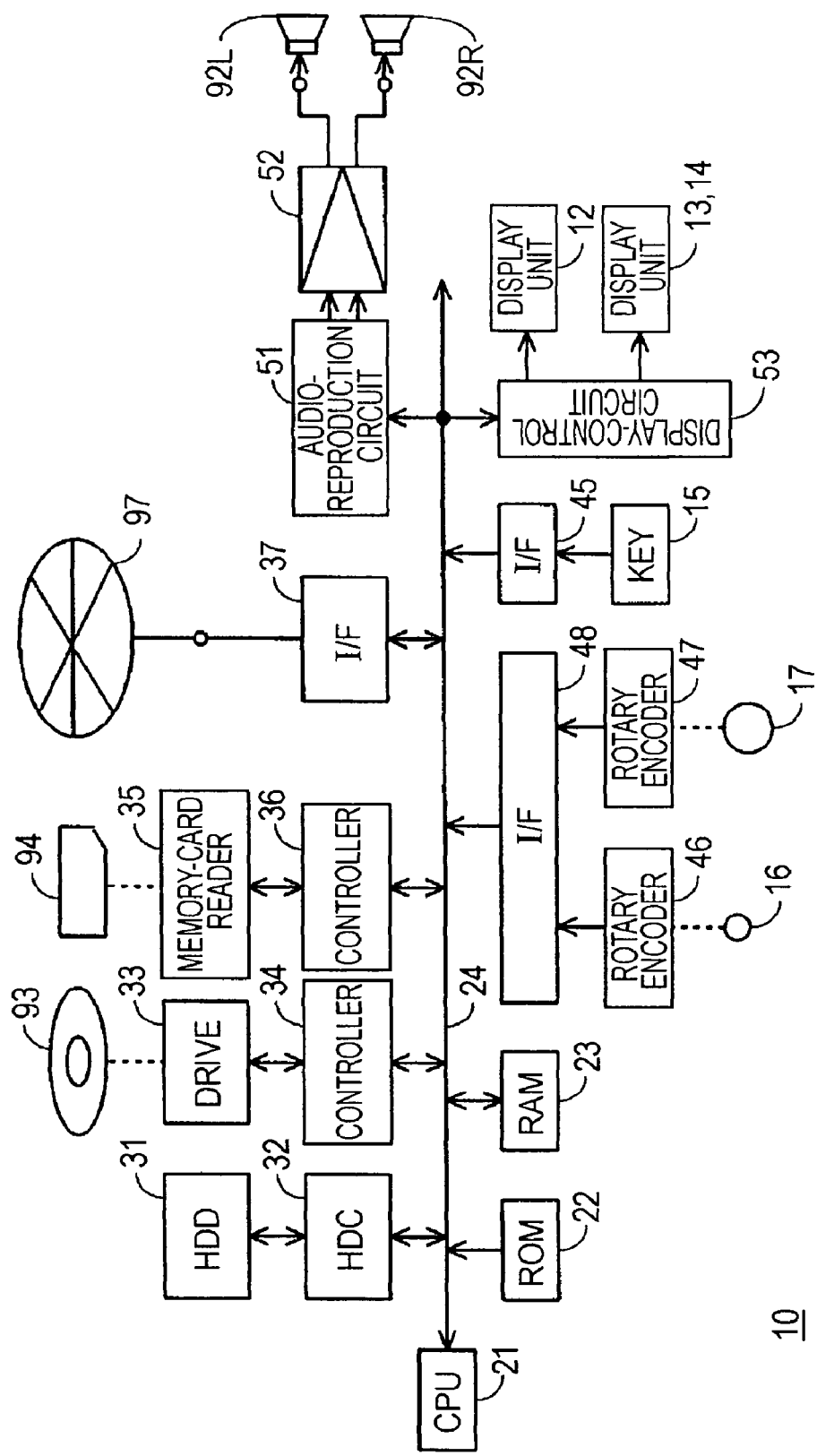
FIG. 2 is a block diagram of another embodiment of the present invention.

FIG. 2 shows an example circuit provided in the above-described audio-reproduction device 10. A central processing unit (CPU) 21, a read-only memory (ROM) 22, and a random-access memory (RAM) 23 are connected to a system bus 24 so that a control circuit 20 is generated. In that case, the CPU 21 operates, so as to execute various programs. The various programs executed by the CPU 21 and essential data are written into the ROM 22. Further, the RAM 22 functions, as a work area, while the CPU 21 executes the program.

A hard-disk drive 31 is connected to the system bus 24 via a hard-disk controller 32, as large-capacity storage. In that case, data on various tracks, metadata on each of the tracks, image data on the jacket of each of the tracks, and so forth are stored in the hard-disk drive 31.

In that case, the track data is compressed according to the MPEG-1/Audio Layer 3 (MPEG) method or the like. Further, the metadata on the track includes information about a link to the track data and data on the track name, the artist's name, the release date, the total number of tracks sold, the ranking, the priority, and so forth, as shown in FIG. 3. Here, the priority indicates for which item the strength of the filtering-selection condition is changed, for example.

Further, as shown in FIG. 2, a disk drive 33 and a memory-card reader 35 are connected to the system bus 24 via controllers 34 and 36. In that case, each of the disk drive 33 and the memory-card reader 35 operates according to the above-described slot method. When a disk 93 and a memory card 94 are inserted into the disk drive 33 and the memory-card reader 35, it becomes possible to access track data or the like recorded onto the disk 93 and/or stored in the memory card 94.

Further, a network-interface circuit 37 is connected to the system bus 24 so that the audio-reproduction device 10 is connected to an external network 97 via the network-interface circuit 37. Then, though not shown, it becomes possible to download track data and/or metadata from a home server, network attached storage (NAS), an external server, and so forth via the network 97.

Further, the selection dial 16 and the zoom dial 17 are connected to rotary encoders 46 and 47, for example. The rotary encoders 46 and 47 are connected to the system bus 24 via an interface 48. When the selection dial 16 and/or the zoom dial 17 is turned, information about the direction in which the dial is turned and the turn amount is transmitted to the CPU 21. Further, the operation buttons 15 are connected to the system bus 24 via an interface 45 so that when any of the operation buttons 15 is pressed down, the CPU 21 is informed that the operation button 15 is pressed down.

Further, the audio-reproduction device 10 includes an audio-reproduction circuit 51 and a display-control circuit 53 that are connected to the system bus 24. Upon receiving track data compressed according to the MP3 method, the audio-reproduction circuit 51 expands the compressed track data, so as to obtain original digital-audio data, performs digital-to-analog (D/A) conversion, so as to convert the digital-audio data into an analog-audio signal, and transmits the analog-audio signal to each of external speakers 92L and 92R.

Further, the main-display part 12 and the sub-display parts 13 and 14 are connected to the display-control circuit 53. Upon receiving display data, the display-control circuit 53 converts the display data into a display signal, and transmits the display signal to the main-display part 12 and/or the sub-display parts 13 and 14 so that an image of the display signal is shown on each of the display parts.

When a predetermined button of the operation buttons 15 is pressed down, track data is acquired from the disk 93, the memory card 94, or the network 97 and stored in the hard-disk drive 31. Further, metadata and/or image data on the jacket of the track is also acquired in the above-described manner and stored in the hard-disk drive 31.

When the track data is reproduced, display data on a thumbnail is generated on the basis of the jacket-image data stored in the hard-disk drive 31 and transmitted to the display-control circuit 53. For example, five thumbnails TN are shown on the main-display part 12 along a horizontal line, as shown in FIG. 1.

In that case, the track data corresponding to a thumbnail TNC provided at the center of the five thumbnails TN is read from the hard-disk drive 31 and transmitted to the audio-control circuit 51. Therefore, the sound of the track indicated by the thumbnail TNC provided at the center of the thumbnails TN is output from the speakers 92L and 92R. At that time, a predetermined display image is shown on each of the sub-display parts 13 and 14.

Further, when each of the selection dial 16 and the zoom dial 17 is turned, a display image of the thumbnails TN shown on the main-display part 12 is changed to another display image and the track data read from the hard-disk drive 31 is changed to different track data according to the above-described change. Therefore, the track data for reproduction is changed to the different track data.

[4] Detailed Description of Dial Operation and Display Image

[4-1] All-Track-Display Mode (when the Power is Turned on)

When the power of the audio-reproduction device 10 is turned on, five thumbnails TN are shown in a row on the main-display part 12. The five thumbnails TN are shown under a condition that had been set by a user. Otherwise, the five thumbnails TN may be those shown on the main-display unit 12 when the power of the audio-reproduction device 10 was turned off last time.

In that case, information about all of the tracks is shown. Namely, each of track-data items stored in the hard-disk drive 31 can be selected. Of the above-described track-data items, data on five tracks that had been released in sequence is shown, as the five thumbnails TN. Namely, the release dates of the five tracks are consecutive. According to the above-described embodiment, the strength of the filtering-selection condition is decreased to the lowest level. That is to say, the zoom-out operation is performed to capacity.

In that case, data on the track corresponding to a thumbnail TNC which is the middle of the five thumbnails is read from the hard-disk drive 31 and reproduced from the speakers 92L and 92R, as described in chapter [3]. Hereinafter, processing performed for the track data corresponding to the middle thumbnail, that is, the thumbnail TNC will be mainly described.

A focus frame FCFR surrounding the thumbnail TNC is shown in red, for example, as a mark indicating the middle thumbnail TNC. Further, a red leader line SUP is shown on the focus frame FCFR and a red leader line SUB is shown under the focus frame FCFR. Further, the track name "Go swim samba" corresponding to the thumbnail TNC is shown in red along the leader line SUP and the artist's name "Hiroshi Go" corresponding to the thumbnail TNC is shown in red along the leader line SUB. Further, on each of the thumbnails TN, data RLSY indicating the release year of the corresponding track is shown. The above-described data on the track name, the artist's name, and the release year is acquired from the corresponding metadata (see FIG. 3) and shown.

On each of the sub-display parts 13 and 14, the icons of jackets of all of the track-data items stored in the hard-disk drive 31 are shown in the order in which the corresponding tracks are released at the absolute time positions. In that case, the icon ICNY corresponding to a track selected through filtering is shown on the sub-display part 13 and the icon corresponding to a track removed through the filtering is shown on the sub-display part 14.

According to the above-described embodiment, the strength of the filtering-selection condition is decreased to the lowest level (the zoom-out operation is performed to capacity). Subsequently, the icons ICNY corresponding to all of the tracks are shown on the sub-display part 13, and no icon is shown on the sub-display part 14.

Of the icons ICNY, the icons corresponding to the five thumbnails TN shown on the main-display part 12 are surrounded by a marking focus frame FSCY shown in red. Further, a focus frame FCSN is shown on the sub-display part 14 at the same position, in terms of time, as that where the focus frame FCSY shown on the sub-display part 13 is shown.

In that case, the icons ICNY corresponding to all of the track-data items are shown on the sub-display part 13. Of the above-described icons ICNY, the icons of the five tracks that had been sequentially released, where the release dates of the five tracks are consecutive, are surrounded by the focus frame FCSY. Further, the thumbnails TN of the tracks corresponding to the icons surrounded by the focus frame FCSY are shown on the main-display part 12.

Accordingly, the five thumbnails TN are largely shown on the main-display part 12. Further, the focus frame FCSY shown on the sub-display part 13 indicates where the five thumbnails TN are located in the entire field including all of the thumbnails. That is to say, the focus frame FCSY surrounding the five thumbnails TN indicates the year range where the tracks corresponding to the five thumbnails TN are released.

Then, when the selection dial 16 and/or the zoom dial 17 is turned, the display image of the thumbnails TN, the display image being shown on the main-display part 12, is changed to another display image, as will be described later in detail. Further, the display image shown on the sub-display part 13, the display image showing the icons and the focus frame FSCY, is changed to another display image. Still further, the display image shown on the sub-display part 14, the display image showing the focus frame FCSN, is changed to another display image.

Figure 4:
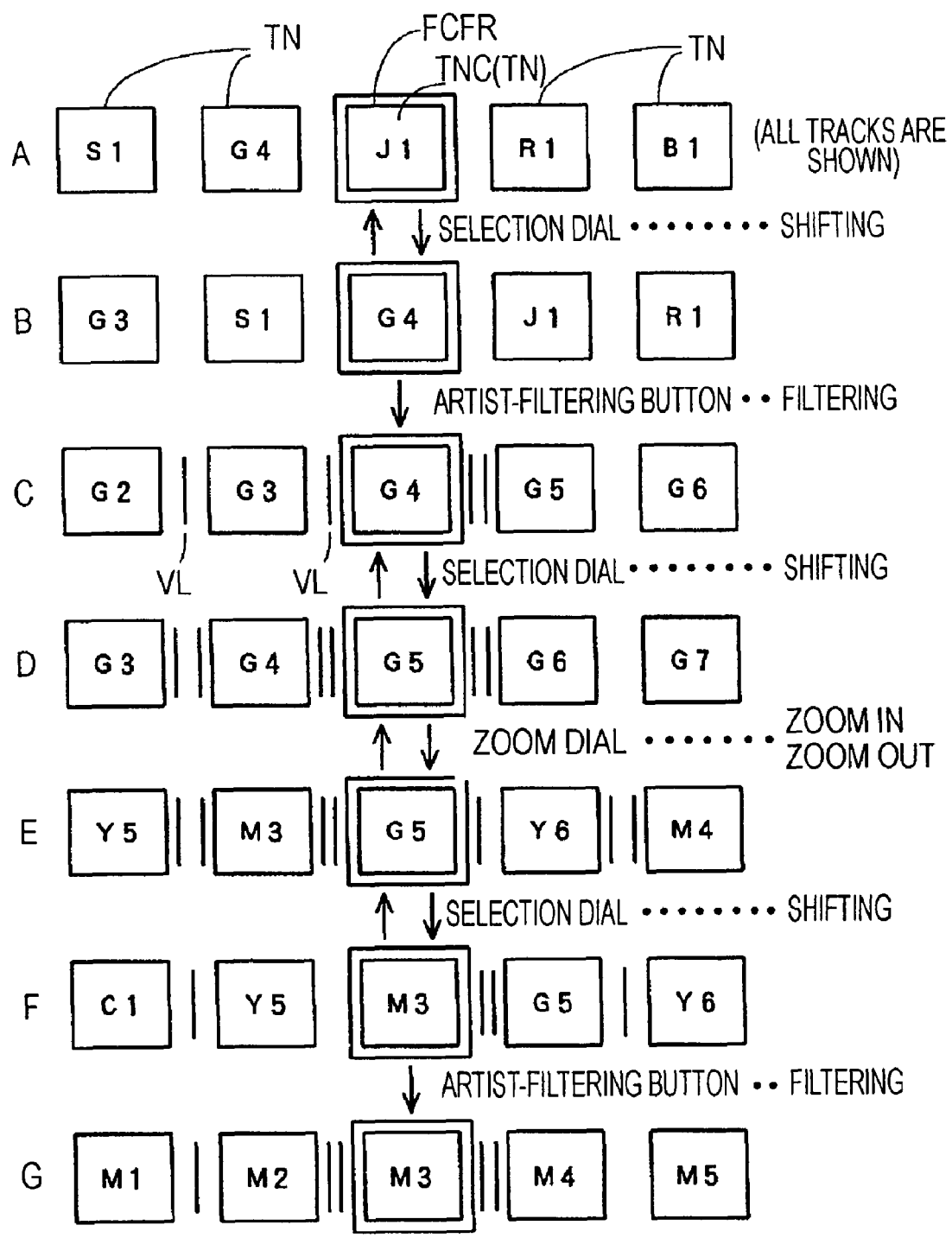
FIG. 4 illustrates details on display images produced according to another embodiment of the present invention.

In the following description, therefore, a thumbnail or an image which is shown, as a thumbnail, will be indicated by the combination of an alphabet and a number, as shown in FIG. 4, so as to clearly show changes in the display image showing the thumbnails TN. Further, for the sake of simplicity, both the reference numeral and character of the thumbnail, and the track corresponding to the thumbnail are indicated by the same combination of the alphabet and the number.

Further, in FIG. 4, one and the same artist is indicated by the same alphabet. However, if there are different tracks played by the same artist, the same alphabets and different numbers are used. For example, reference numerals G1 and G2 indicate a first track G1 and a second track G2 that are played by one and the same artist G. Further, reference numerals G1 and G2 indicate the thumbnails corresponding to the first and second tracks G1 and G2.

Then, part A of FIG. 4 indicates thumbnails shown in the all-track-display mode described in chapter [4-1]. In that case, the marking-focus frame FCFR surrounding a thumbnail J1 provided at the center of the thumbnails TN is shown in the above-described manner, and the leader lines SUP and SUB extending from the focus frame FCFR, the track name, and the artist's name are not shown, as is the case with parts B, C, D, E, F, and G of FIG. 4.

[4-2] Selection-Display Mode

For example, in part A of FIG. 4, predetermined thumbnails TN are shown. When the selection dial 16 is turned clockwise by as much as one click the thumbnails shown on the main-display part 12 are shifted in the right direction by as much as one frame so that a thumbnail G4 is shown at the center of other thumbnails and the thumbnail G4 is surrounded by the focus frame FCFR, as shown in part B of FIG. 4. Further, data on the track G4 corresponding to the thumbnail G4 is reproduced.

From then on, when the selection dial 16 is turned clockwise, the thumbnails are shifted in the right direction by as much as the frames corresponding to the click number, and data on the track corresponding to a thumbnail that is shown at the center of other thumbnails and that is surrounded by the focus frame FCFR is reproduced in the above-described manner.

On the other hand, when the thumbnails are shown, as is the case with part B shown in FIG. 4, and when the selection dial 16 is turned counterclockwise by as much as one click, the thumbnails are shifted in the left direction by as much as one frame so that the thumbnail J1 is shown at the center of the other thumbnails and surrounded by the focus frame FCFR, as shown in part A of FIG. 4. Further, data on the track J1 corresponding to the thumbnail J1 is reproduced.

From then on, when the selection dial 16 is turned counterclockwise, the thumbnails are shifted in the left direction by as much as the frames corresponding to the click number, and data on the track corresponding to a thumbnail that is shown at the center of other thumbnails and that is surrounded by the focus frame FCFR is reproduced in the above-described manner.

Thus, by turning the selection dial 16, the thumbnails are shifted in the direction in which the selection dial 16 is turned by as much as the turning amount. Further, each of the focus frame FCSY shown on the sub-display part 13 and the focus frame FCSN shown on the sub-display part 14 is shifted according to the shifted thumbnails shown on the main-display part 12. However, the time position of the icon ICNY is not changed.

Further, data on the track corresponding to a thumbnail that is shown at the center of other thumbnails and that is surrounded by the focus frame FCFR is reproduced. Thus, data on a predetermined track can be selected and reproduced by turning the selection dial 16.

[4-3] Filtering (Filtering Performed on the Basis of the Artist's Name)

For example, when an artist-filtering button of the operation buttons 16 is pressed down when the thumbnails are shown, as is the case with part B of FIG. 4, filtering is performed for the thumbnails corresponding to track-data items stored in the hard-disk drive 31.

In that case, the filtering-selection condition is determined to be information about the artist who plays the track corresponding to the thumbnail indicated by the focus frame FCFR. In part B of FIG. 4, the focus frame FCFR specifies a thumbnail G4. Since the thumbnail G4 corresponds to an artist G, information about the artist G is determined to be the filtering condition. The filtering is achieved by referring to the metadata shown in FIG. 3.

As a result, of the thumbnails corresponding to all of the track-data items stored in the hard-disk drive 31, the thumbnails G2, G3, G4, G5, and G6 relating to the artist G are shown on the main-display part 12 in the order in which the corresponding tracks are released, as shown in part C of FIG. 4. Namely, the positions of the thumbnails G2 to G6 are determined on the basis of the release dates of the corresponding tracks.

At that time, filtering-selection items and the filtering-selection condition is shown in yellow on the main-display part 12, as indicated by reference characters TGT shown in FIG. 1. Further, the above-described thumbnail G4 is still shown at the position indicated by the focus frame FCFR and data on the track G4 corresponding to the thumbnail G4 is subsequently reproduced.

Further, at that time, a predetermined sign indicating the existence of a thumbnail (track) that had been removed through thinning-out achieved by the filtering is shown between the thumbnails. According to the above-described embodiment, at least one vertical line VL is shown. The number of the at least one vertical line VL is determined, as below, for example.

When a single thumbnail is removed through the thinning-out, the number of the at least one vertical line VL is one.

When two to five thumbnails are removed through the thinning-out, the number of the at least one vertical line VL is two.

When six or more thumbnails are removed through the thinning-out, the number of the at least one vertical line VL is three.

Therefore, in part C of FIG. 4, for example, the single vertical line VL is shown between the thumbnails G2 and G3, which shows that single-track data that had been stored between data on the track G2 and data on the track G3 is removed through the thinning-out.

Figure 5:
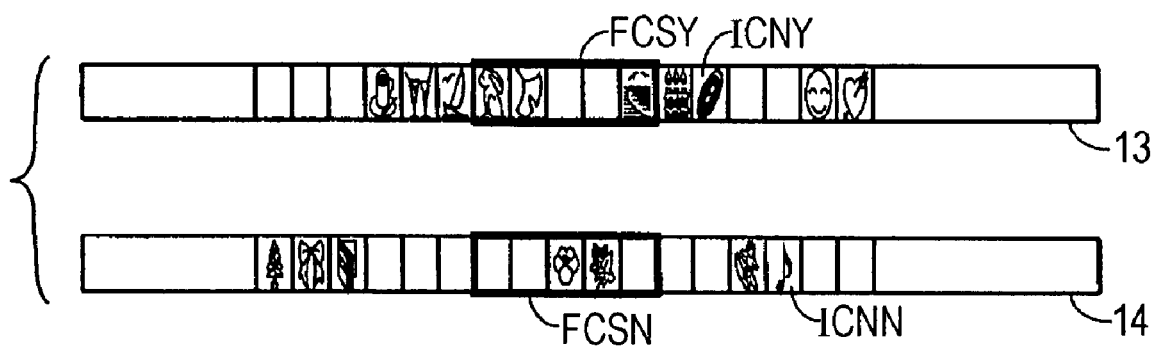
FIG. 5 illustrates details on other display images produced according to another embodiment of the present invention.

Further, the sub-display part 13 shows the icon ICNY corresponding to a track selected through the filtering, and the focus frame FCSY surrounding the icon corresponding to a thumbnail shown on the main-display part 12, as shown in FIG. 5.

Further, the sub-display part 14 shows the icon ICNN corresponding to track data removed through the filtering and the focus frame FCSN at the same position as that where the focus frame FCSY is shown. Therefore, the result of filtering, that is, where data on a target track is stored in the entire field including the entire track data (the year range where the target track data is released) is shown.

Subsequently, of the thumbnails shown on the main-display part 12, the thumbnail corresponding to a track played by a target artist is selected by turning the selection dial 16 and the artist-filtering button is pressed down, as shown in parts A and B of FIG. 4. Then, only the thumbnail corresponding to the track played by the target artist is retrieved and extracted, and shown on the main-display part 12, as shown in part C of FIG. 4.

When the selection dial 16 is turned in a predetermined direction in the above-described state, the thumbnails are shifted in the predetermined direction by as much as the turning amount, as shown in parts C and D of FIG. 4, as is the case where the selection-display mode described in chapter [4-2] is selected. Further, data on the track corresponding to a thumbnail surrounded by the focus frame FCFR is reproduced. Thus, the above-described embodiment allows for selecting and reproducing data on a desired track from among data on tracks played by the target artist.

[4-4] Change of the Strength of Filtering-Selection Condition (Zooming)

When the thumbnails are shown, as shown in parts C and D of FIG. 4, only data on a track played by the artist G is selected and the thumbnail and icon of the selected track are shown on the main-display part 12 and the sub-display part 13. This is because the strength of the filtering-selection condition is increased to the highest level, which allows for zooming in on the artist G to capacity.

When the zoom dial 17 is turned counterclockwise by as much as one click where the thumbnails are shown, as shown in part D of FIG. 4, the strength of the filtering-selection condition is decreased by as much as a single scale. Namely, the zoom-out operation is performed by as much as the single scale. In that case, an item for which the selection strength should be decreased is the item "priority" of the metadata shown in FIG. 3. In the following description, however, the item for which the selection strength should be decreased is determined to be the item "yearly ranking".

Then, the thumbnail of a different track played by a different artist is also shown on the main-display part 12 in addition to the thumbnails that had been shown, as shown in part E of FIG. 4, where the year ranking of the different track played by the different artist is lower than that of the track G5 corresponding to the thumbnail G5 by as much as a single place. At that time, the above-described thumbnail G5 is still shown at the position indicated by the focus frame FCFR and data on the track G5 corresponding to the thumbnail G5 is subsequently reproduced.

When the zoom dial 17 is further turned counterclockwise by as much as one click where the thumbnails are shown, as shown in part E of FIG. 4, the strength of the filtering-selection condition is further decreased by as much as a single scale. In that case, the thumbnail of the different track is also shown on the main-display part 12, where the yearly ranking of the different track is lower than that of the track G5 by as much as two places.

After that, when the zoom dial 17 is turned counterclockwise by as much as a predetermined number of clicks, the range of the yearly ranking is increased by as much as the predetermined number of clicks, and the thumbnail of a track released in the yearly-ranking range is shown. Thus, it becomes possible to zoom out on the thumbnail display on the basis of the yearly ranking by turning the zoom dial 17 counterclockwise. Here, it should be noted that the all-track-display mode denotes the state where the zoom-out operation is performed to capacity.

When the zoom dial 17 is turned clockwise by as much as a single click where the zoom-out operation is performed to capacity, the filtering-selection condition is increased by as much as a single scale. In that case, the value of the yearly ranking is increased so that details on the display image of the thumbnails are eventually changed to those shown in part D of FIG. 4. That is to say, the zoom-in operation is performed by turning the zoom dial 17 clockwise.

Thus, when the zoom dial 17 is turned, the zoom-out operation and/or the zoom-in operation is performed by as much as the turning amount in the direction in which the zoom dial 17 is turned. Further, in that case, details on a display image of the icon ICNY and the focus frame FCSY, the display image being shown on the sub-display part 13, and those on a display image of an icon ICNN and the focus frame FCSN, the display image being shown on the sub-display part 14, are changed according to the thumbnail-display image shown on the main-display part 12, as shown in FIG. 5.

Further, when the selection dial 16 is turned in a predetermined direction after the zoom-out operation is performed, as shown in part E of FIG. 4, the thumbnails are shifted in the predetermined direction by as much as the turning amount, as shown in parts E and R of FIG. 4, as is the case where the selection-display mode described in chapter [4-2] is selected. Subsequently, it becomes possible to select any artist other than the artist G.

[4-5] Filtering after Zoom Operation

When the artist-filtering button of the operation buttons 15 is pressed down after the thumbnails are shown, as in part F of FIG. 4, filtering is performed for track-data items corresponding to the icon ICNY shown on the sub-display part 13, as is the case with the filtering performed, as described in chapter [4-3].

In that case, the filtering-selection condition is determined to be information about an artist playing the track corresponding to a thumbnail indicated by the focus frame FCFR. In part F of FIG. 4, a thumbnail M3 is indicated by the focus frame FCFR. Since the thumbnail M3 corresponds to an artist M, information about the artist M is determined to be the filtering condition.

As a result, of the thumbnails corresponding to all of the track-data items stored in the hard-disk drive 31, the thumbnails M1, M2, M3, M4, and M5 corresponding to tracks played by the artist M are shown on the main-display part 12 in the order in which the tracks are released. Namely, the positions of the thumbnails M1 to M5 are determined on the basis of the release dates of the corresponding tracks. Further, the above-described thumbnail M3 is still shown at the position indicated by the focus frame FCFR and data on the track M3 corresponding to the thumbnail M3 is subsequently reproduced.

Subsequently, of the thumbnails shown on the main-display part 12, the thumbnail corresponding to a track played by a target artist is selected by turning the selection dial 16 and the artist-filtering button is pressed down. Then, only the thumbnail corresponding to the track played by the target artist is retrieved and extracted, and shown on the main-display part 12, as shown in part C of FIG. 4.

When the selection dial 16 is turned after the thumbnails are shown, as in part C of FIG. 4, the thumbnails are shifted, as is the case where the selection-display mode described in chapter [4-2] is selected. Subsequently, it becomes possible to select a desired track from among the tracks played by the artist M and reproduce data on the desired track.

[5] Example Software Program

Figure 6:
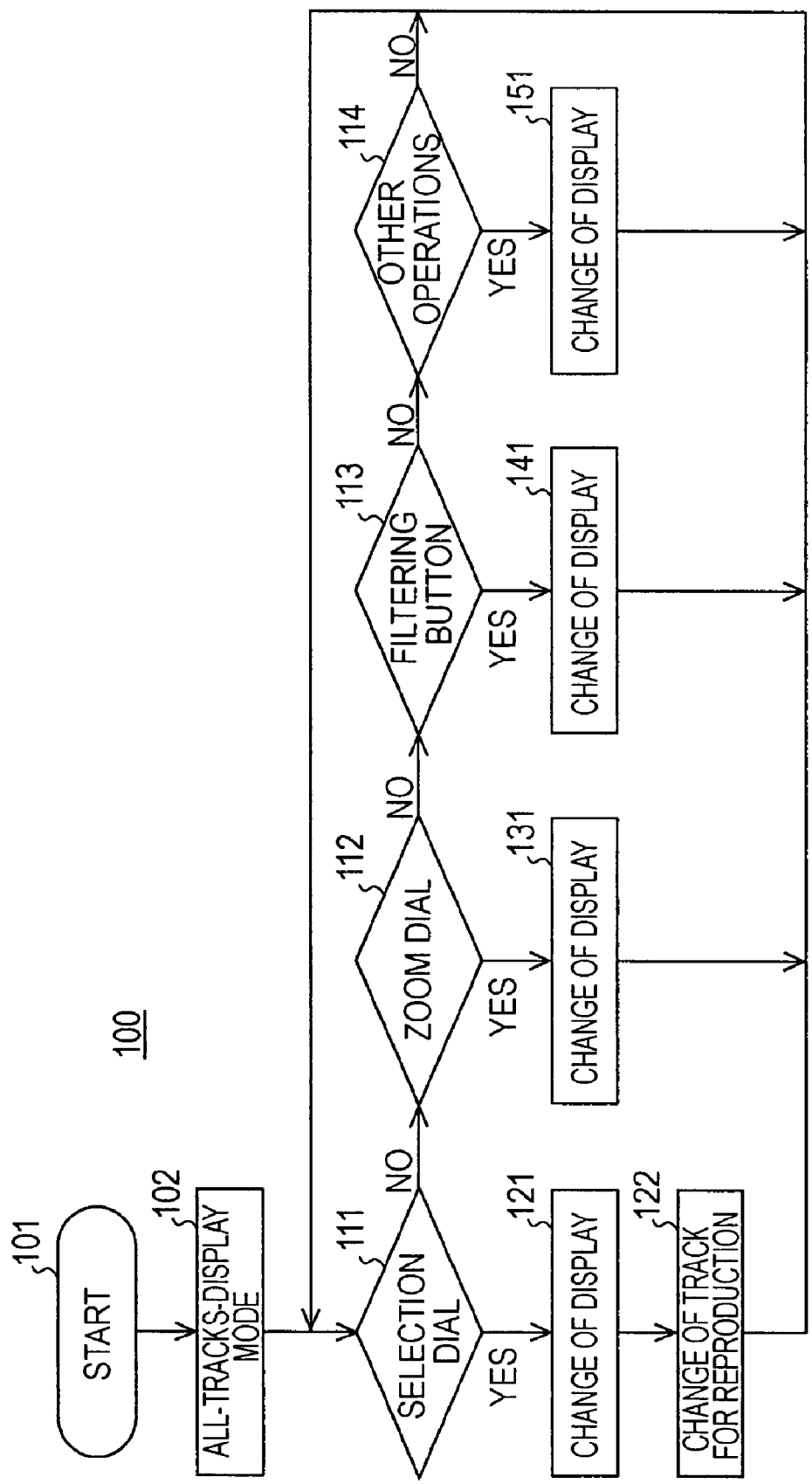
FIG. 6 is a flowchart illustrating another embodiment of the present invention.

Reference numeral 100 shown in FIG. 6 shows an example routine executed, so as to produce display images, as described in chapter [4]. Data on a routine 100 is stored in a read-only memory (ROM) 22 and the routine 100 is executed by the CPU 21. Of processing procedures performed according to the routine 100, FIG. 6 shows processing procedures relating to an embodiment of the present invention alone.

When the power of the audio-reproduction device 10 is turned on, the CPU 21 starts performing the processing procedures of the routine 100, at step 101. Next, the all-track-display mode described in chapter [4-1] is set, at step 102. Therefore, the thumbnails TN and the focus frame FCFR are shown, as shown in FIG. 1 and part A of FIG. 4. Further, reproduction of data on a track indicated by the focus frame FCFR is started.

Then, the processing advances to step 111 so that the processing procedures corresponding to steps 111 to 114 are performed repeatedly until the user performs an operation and transmits data to the CPU 21. Namely, it is determined whether or not the selection dial 16 is operated, at step 111. If the selection dial 16 is not operated, the processing advances from step 111 to step 112 where it is determined whether or not the zoom dial 17 is operated. If the zoom dial 17 is not operated, the processing advances from step 112 to step 113.

Then, at step 113, it is determined whether or not the artist-filtering button of the operation buttons 15 is operated. If the artist-filtering button is not operated, the processing advances from step 113 to step 114 where it is determined whether or not any of the operation buttons 15 other than the artist-filtering button is operated. If any operation button other than the artist-filtering button is not operated, the processing returns from step 114 to step 111. In that case, therefore, all of track-data items are shown and the steps 111 to 114 are performed repeatedly until the user operates the operation button and transmits data.

For example, when the selection dial 16 is turned by as much as a single click, while the CPU 21 waits for the operation data transmitted from the user, it is determined that the selection dial 16 is operated, at step 111 so that the processing advances from step 111 to step 121 where the CPU 21 enters the selection-display mode described in chapter [4-2].

At step 121, display data transmitted to the display-control circuit 53 is changed so that details on a display image of thumbnails, the display image being shown on the main-display part 12, are changed from those shown in part A of FIG. 4 to those shown in part B of FIG. 4 and details on each of display images shown on the sub-display parts 13 and 14 are also changed, for example.

Then, at step 122, the track data read from the hard-disk drive 31 is changed so that track data for reproduction is changed to the track data corresponding to the thumbnail TNC indicated by the focus frame FCFR. Then, the processing returns to step 111, so as to wait until the user performs the next operation. Therefore, it becomes possible to shift the thumbnails TN shown on the main-display part 12 in the right direction and/or the left direction, and change a track-data item for reproduction to another track-data item by turning the selection dial 16.

For example, when the zoom dial 17 is turned by as much as a single click while the steps 111 to 114 are performed repeatedly, so as to wait for the operation data transmitted from the user, it is determined that the zoom dial 17 is operated, at step 112. Then, the processing advances from step 112 to step 131 so that the zoom operation described in chapter [4-4] is performed.

At step 131, the strength of the filtering-selection condition is changed. As a result, the display data transmitted to the display-control circuit is changed so that details on a display image shown on the main-display part 12 are changed from those shown in part D of FIG. 4 to those shown in part E of FIG. 4 and details on each of display images shown on the sub-display parts 13 and 14 are also updated, for example. After that, the processing returns to step 111, so as to wait until the user performs the next operation. Thus, it becomes possible to zoom in and/or out on the thumbnails TN shown on the main-display part 12 by turning the zoom dial 17. In that case, the track data for reproduction is not changed.

Further, when the artist-filtering button of the operation buttons 15 is pressed down while steps 111 to 114 are repeatedly performed, so as to wait for the next operation data transmitted from the user, it is determined that the artist-filtering button is pressed down, at step 113. Subsequently, the processing advances from step 113 to step 141 so that the filtering is performed, as described in chapter [4-3] and/or chapter [4-5].

At step 141, filtering is performed so that the display data transmitted to the display-control circuit 53 is changed. Subsequently, details on a display image shown on the main-display part 12 are changed from those shown in part B of FIG. 4 to those shown in part C of FIG. 4 and details on each of display images shown on the sub-display parts 13 and 14 are also updated, for example. After that, the processing returns to step 111, so as to wait until the user performs the next operation. Thus, it becomes possible to perform filtering for the thumbnails TN shown on the main-display part 12 by pressing down the artist-filtering button. In that case, the track data for reproduction is not changed.

Further, when any operation button other than the artist-filtering button is pressed down while steps 111 to 114 are repeatedly performed, so as to wait for the next operation data transmitted from the user, it is determined that the above-described operation button is pressed down, at step 114. Subsequently, the processing advances from step 114 to step 151 where the processing corresponding to the pressed-down operation button is performed. Then, the processing returns to step 111, so as to wait until the user performs the next operation.

Thus, the execution of the routine 100 allows for producing display images, as described in chapter [4]. For example, the routine 100 allows for retrieving and reproducing target track data with stability, as shown in FIG. 4.

[6] Brief Account of Embodiment of the Present Invention

As shown in FIG. 4, the above-described audio-reproduction device 10 performs the steps of:

(1) showing the thumbnails corresponding to stored track data, (2) performing filtering for the thumbnails shown, at step (1), under a predetermined selection condition, (3) turning the zoom dial 17, so as to make the strength of the selection condition variable, and (4) selecting any of the thumbnails by turning the selection dial 16.

As a result, it becomes possible to track down thumbnails related to a target thumbnail in sequence and eventually retrieve the target thumbnail by turning the selection dial 16 and the zoom dial 17. Further, while the selection dial 16 and the zoom dial 17 are turned, the thumbnails overlap one another with reference to at least one of the items of the metadata shown in FIG. 3 and the display image of the thumbnails is continuously changed in an analog fashion. Therefore, it becomes easy to retrieve the target thumbnail.

[7] Other Embodiments

According to chapter [4-3], the filtering-selection condition is determined to be the artist information. However, the filtering-selection condition may be determined to be information about the genre, name, release-year range, ranking, and so forth of a track. Further, according to the above-described embodiment, the strength of the filtering-selection condition is changed for the items shown on the basis of the priority of the metadata. However, an item which is the target of filtering can be selected by operating a special-purpose dial and/or an operation button, where details on the target item are the same as those of the item of the metadata.

Although contents handled in the above-described embodiment are the track data, the contents may be video data, still-image data, text data, and so forth as long as the data can be made into an electronic file and shown, as a thumbnail. Further, according to the above-described embodiment, data on the track corresponding to a thumbnail surrounded by the focus frame FCFR shown on the main-display part 12 is selected at all times. However, according to another embodiment of the present invention, when the user presses down a predetermined execution button while predetermined track data is reproduced, the audio-reproduction device 10 may switch from the track data that had been reproduced by then to the track data corresponding to the thumbnail surrounded by the focus frame FCFR, and reproduce the track data corresponding to the surrounded thumbnail.

Further, each of the selection dial 16 and the zoom dial 17 may be provided, as an operation button, or a touch key generated by using the main-display part 12. Still further, even though the present invention is used for the audio-reproduction device 10 according to the above-described embodiments, the present invention can be used for an apparatus and/or a device including a personal computer, an audio-and-visual (AV) device, and so forth as long as the apparatus and/or device can reproduce the above-described contents.

It should be understood by those skilled in the art that various modifications, combinations, sub-combinations and alterations may occur depending on design requirements and other factors insofar as they are within the scope of the appended claims or the equivalents thereof.

What is claimed is:

1. A content-retrieval device comprising:
   means for performing a first operation;
   means for performing a second operation;
   a first display unit;
   storage storing contents; and
   a control circuit to show at least two thumbnails of the contents stored in the storage and an image of a mark indicating one of the thumbnails on the first display unit,
   perform filtering, when showing the thumbnails, for the shown thumbnails under a predetermined selection condition,
   change a strength of the selection condition under which the filtering is performed when the means for performing the first operation is operated, and
   change the thumbnail indicated by the mark image to another of the thumbnails when the means for performing the second operation is operated,
   wherein changing a strength of the selection condition under which the filtering is performed comprises increasing or decreasing the strength of the selection condition by a single place relative to the content corresponding to the thumbnail indicated by the mark image.

2. The content-retrieval device according to claim 1, further comprising a second display unit, and
   wherein an icon of contents selected through the filtering is shown on the second display unit.

3. The content-retrieval device according to claim 2, further comprising a third display unit, and
   wherein an icon of contents removed through the filtering is shown on the third display unit.

4. The content-retrieval device according to claim 1, wherein the predetermined selection condition comprises a selection condition selected from a group of attributes for content corresponding to the thumbnail indicated by the marked image, the group consisting of an artist, a genre, a name, a release-year range, and a ranking.

5. The content-retrieval device according to claim 1, wherein:
   the selection condition under which the filtering is performed comprises a yearly ranking of contents.

6. The content-retrieval device according to claim 1, wherein changing the thumbnail indicated by the mark image to another of the thumbnails comprises shifting the thumbnails to the left or to the right based on the second operation.

7. A content-retrieval method comprising:
   showing at least two thumbnails of contents stored in storage and an image of a mark indicating at least one of the thumbnails,
   performing filtering, when showing the thumbnails, for the shown thumbnails under a predetermined selection condition,
   changing a strength of the selection condition under which the filtering is performed when a first operation is performed, and
   changing the thumbnail indicated by the mark image to another of the thumbnails when a second operation is performed,
   wherein changing a strength of the selection condition under which the filtering is performed comprises increasing or decreasing the strength of the selection condition by a single place relative to the content corresponding to the thumbnail indicated by the mark image.

8. A recording medium onto which a content-retrieval program is recorded, the content-retrieval program being provided, so as to make a computer execute processing comprising:
   display processing to show at least two thumbnails of contents stored in storage and an image of a mark indicating one of the thumbnails,
   filtering processing to execute filtering, when showing the thumbnails, for the shown thumbnails under a predetermined selection condition,
   first change processing to change a strength of the selection condition under which the filtering is performed when first operation means is operated, and
   second change processing to change the thumbnail indicated by the mark image to another of the thumbnails when second operation means is operated,
   wherein changing a strength of the selection condition under which the filtering is performed comprises increasing or decreasing the strength of the selection condition by a single place relative to the content corresponding to the thumbnail indicated by the mark image.

9. A content-retrieval device comprising:
   a first unit to perform a first operation;
   a second unit to perform a second operation;
   a first display unit;
   storage storing contents; and
   a control circuit to
   show at least two thumbnails of the contents stored in the storage and an image of a mark indicating one of the thumbnails on the first display unit,
   perform filtering, when showing the thumbnails, for the shown thumbnails under a predetermined selection condition,
   change a strength of the selection condition under which the filtering is performed when the unit for performing the first operation is operated, and
   change the thumbnail indicated by the mark image to another of the thumbnails when the unit for performing the second operation is operated,
   wherein changing a strength of the selection condition under which the filtering is performed comprises increasing or decreasing the strength of the selection condition by a single place relative to the content corresponding to the thumbnail indicated by the mark image.

10. The content-retrieval device according to claim 9, wherein the first unit for performing the first operation comprises a first dial.

11. The content-retrieval device according to claim 10, wherein increasing or decreasing the strength of the selection condition by a single place relative to the content corresponding to the thumbnail indicated by the mark image is performed in response to an indication that the first dial has turned by one click.

12. The content-retrieval device according to claim 11, wherein the control circuit increases the strength of the selection condition by a single place relative to the content corresponding to the thumbnail indicated by the marked image in response to an indication that the first dial has turned clockwise by one click.

13. The content-retrieval device according to claim 11, wherein the control circuit decreases the strength of the selection condition by a single place relative to the content corresponding to the thumbnail indicated by the marked image in response to an indication that the first dial has turned counterclockwise by one click.

14. The content-retrieval device according to claim 10, wherein the second unit for performing the second operation comprises a second dial.

15. The content-retrieval device according to claim 14, wherein changing the thumbnail indicated by the mark image to another of the thumbnails comprises shifting the thumbnails to the left or to the right by one frame in response to an indication that the second dial has turned by one click.

16. The content-retrieval device according to claim 15, wherein the control circuit shifts the thumbnails to the right by one frame in response to an indication that the second dial has turned clockwise by one click.

17. The content-retrieval device according to claim 15, wherein the control circuit shifts the thumbnails to the left by one frame in response to an indication that the second dial has turned counterclockwise by one click.

18. The content-retrieval device according to claim 14, wherein the first dial and the second dial are coaxially provided so that the second dial is inside the first dial.

* * * * *